May 30, 1939.  A. H. HABERSTUMP  2,160,015
VEHICLE SEAT
Filed Dec. 11, 1933    6 Sheets-Sheet 3
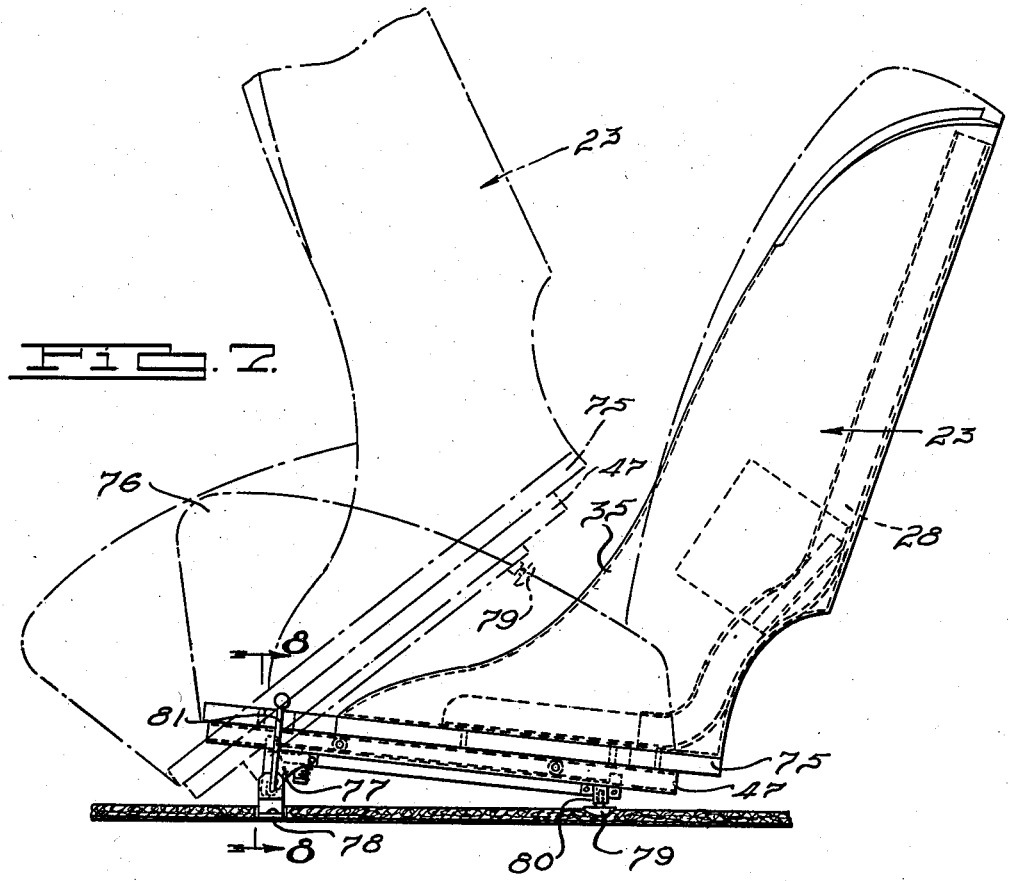
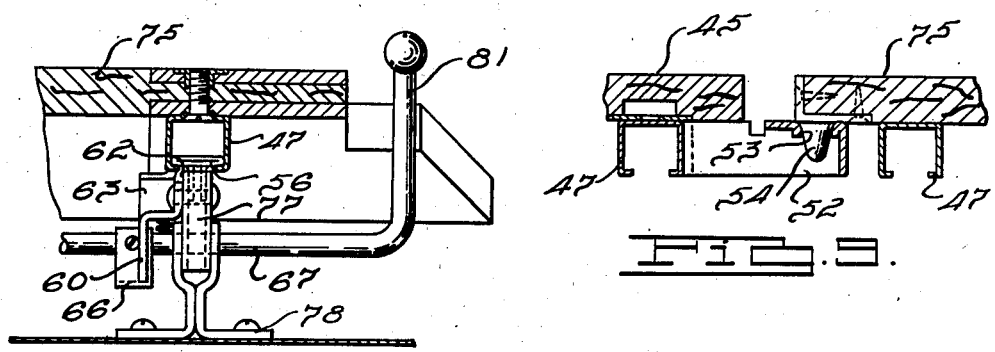
INVENTOR.
Alfred H. Haberstump.
BY
Harness, Dickey, Pierce & Hann
ATTORNEYS.

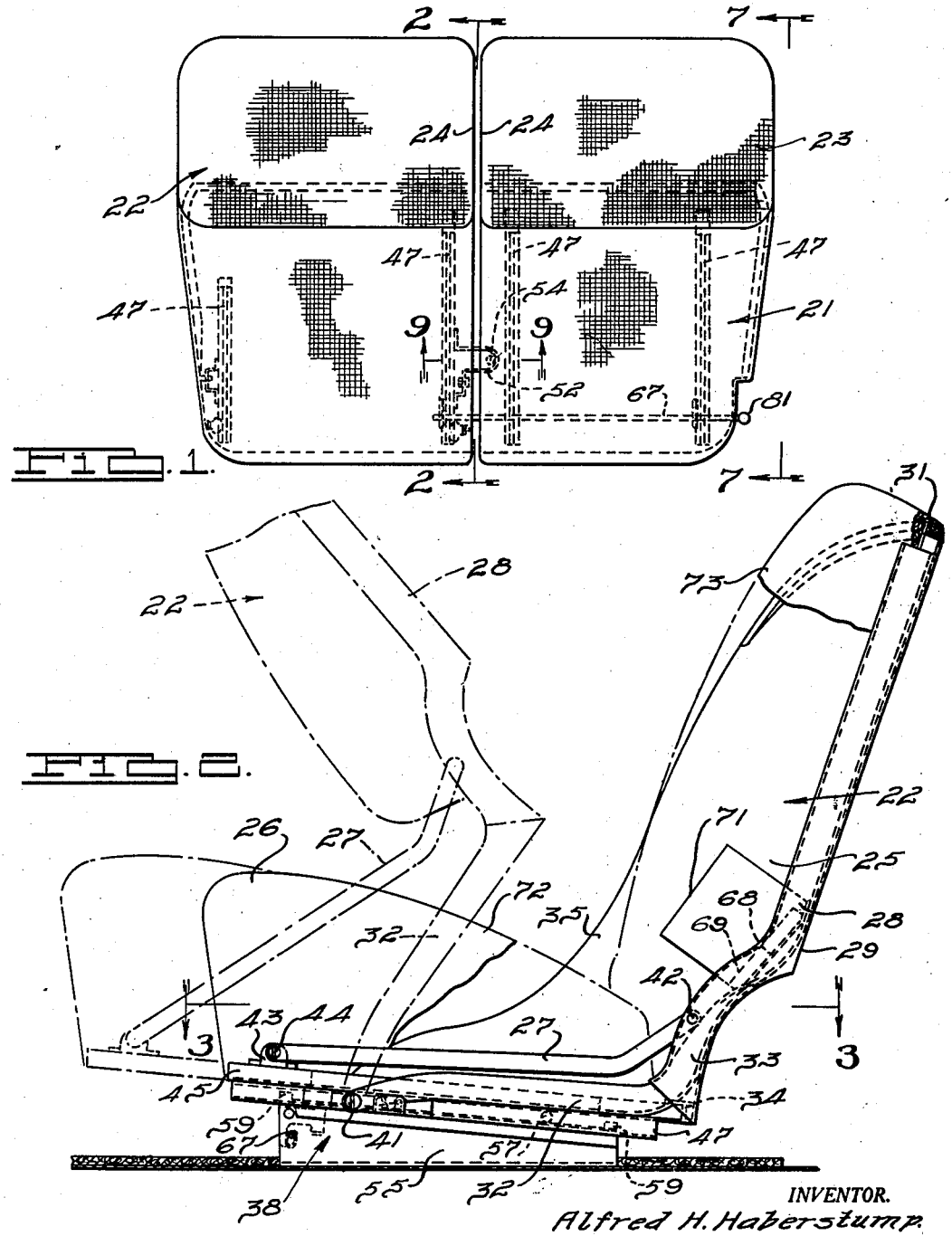

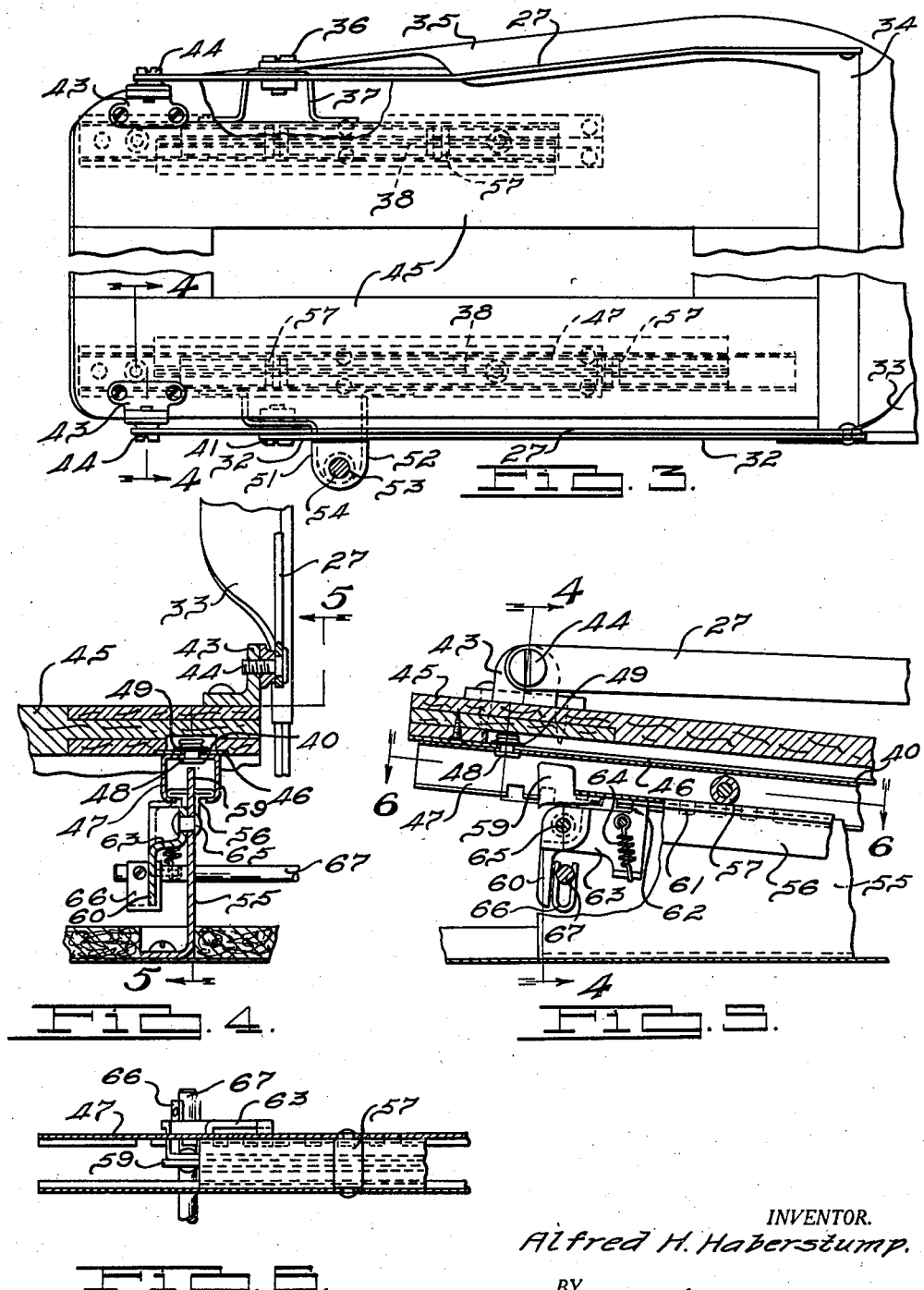

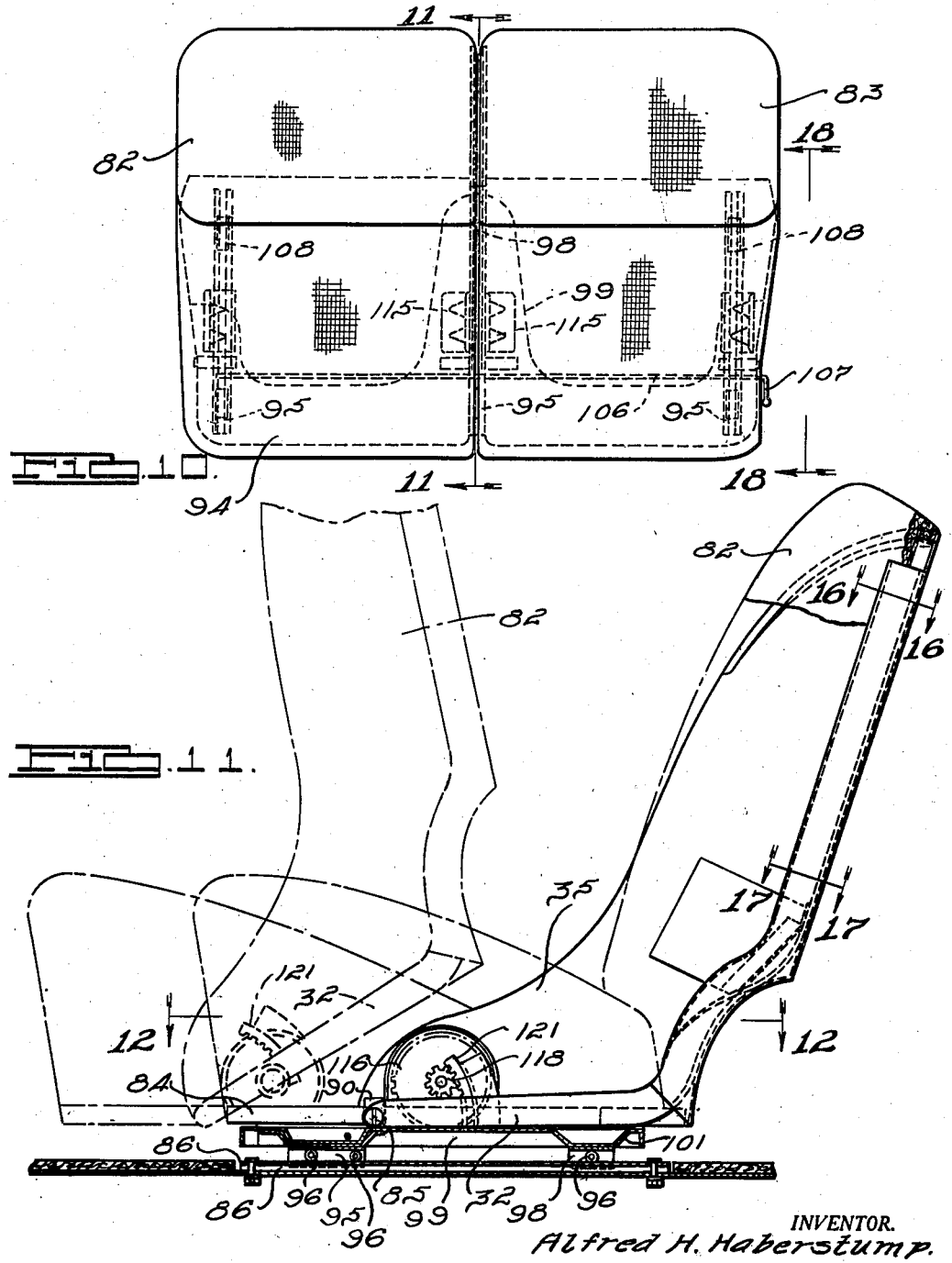

May 30, 1939.  A. H. HABERSTUMP  2,160,015
VEHICLE SEAT
Filed Dec. 11, 1933  6 Sheets-Sheet 5
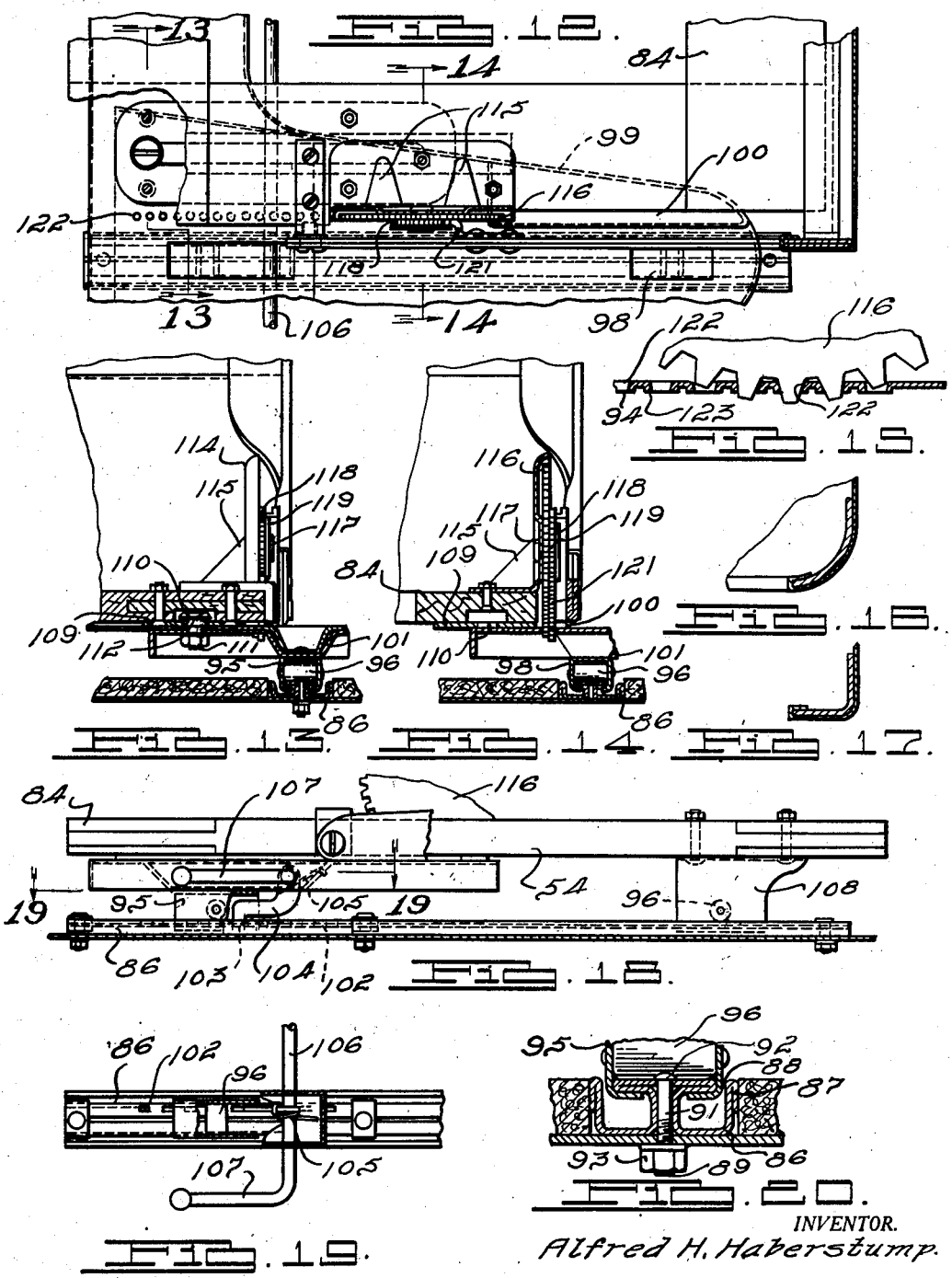
INVENTOR.
Alfred H. Haberstump.
BY
Harness, Dickey, Pierce & Hann.
ATTORNEYS.

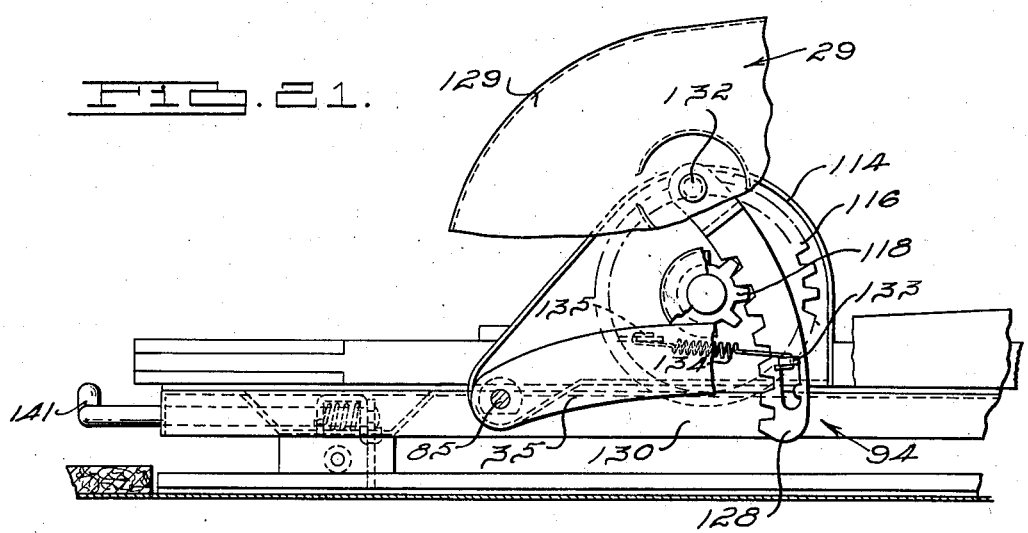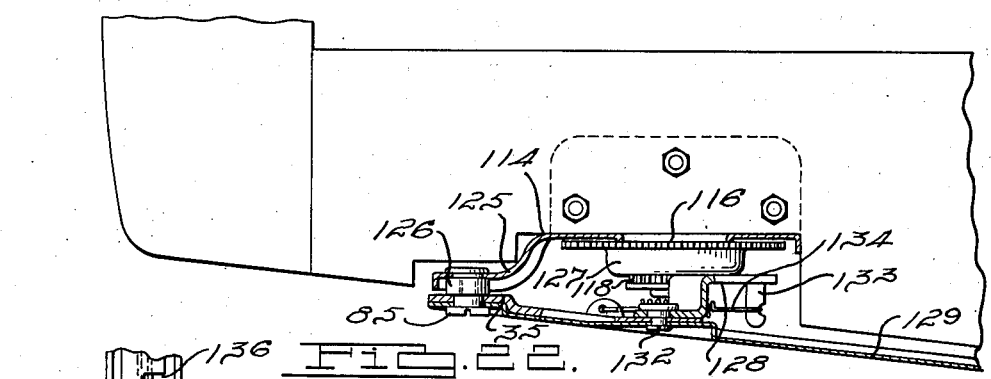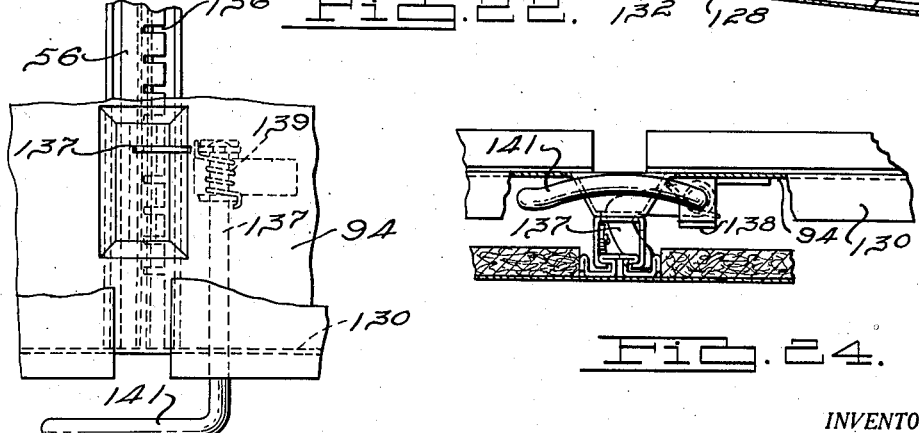

Patented May 30, 1939

2,160,015

UNITED STATES PATENT OFFICE 2,160,015

VEHICLE SEAT

Alfred H. Haberstump, Detroit, Mich., assignor to The Murray Corporation of America, a corporation of Delaware Application December 11, 1933, Serial No. 701,741

6 Claims. (Cl. 155—14)

My invention relates to vehicle body seats and particularly to a front seat therefor which is adjustable as a unit and which is divided and constructed to have each half move independent of the other half.

The front passenger and driver seats for vehicle bodies have been constructed heretofore as separate elements, each to be occupied by a single person, limiting the front seating capacity to two occupants. It is well known that three passengers often occupy the two seats, but the space between the seats was of such width that the person occupying the central position was never comfortably seated. Adjustment was provided for the driver's seat so that it could be positioned in conformity with the size of the operator and such construction caused the seats to be moved in staggered relation which was further objectionable to the central occupancy of the seat.

In the present invention, I have constructed a split seat in the form of a single large seat to be occupied by three persons and have mounted the seats in such manner as to have them adjustable as a unit. Each half of the seat is so constructed that it may be moved independent of the other to provide room at either side of the body for a person entering or leaving the rear compartment. The construction of the seat halves is such as to provide a large entrance room for a small movement of the seat back which adds further novelty to the invention.

Accordingly, the main objects of my invention are; to construct a seat for the front compartment of a vehicle body of a breadth to be occupied by three persons and split to have each half of the seat adjustable to provide entrance room to the rear compartment; to provide a split seat which is adjustable as a unit with the split portions individually movable; to provide a seat which is so constructed as to produce a large opening through a minimum amount of movement to the seat back; and, in general, to construct a seat which is positionable as a unit having portions individually movable and which provides a comfortable seat medially of the junction of the two movable portions, all of which is simple in construction, positive in operation and economical of manufacture.

Other objects and features of novelty of my invention will be either specifically pointed out or will become apparent when referring, for a better understanding of my invention, to the following description taken in conjunction with the accompanying drawings, wherein:

Figure 1 is a plan view of a seat embodying features of my invention.

Fig. 2 is an enlarged sectional view of the structure illustrated in Fig. 1, taken on the line 2—2 thereof.

Fig. 3 is an enlarged broken sectional view of the structure illustrated in Fig. 2, taken on the line 3—3 thereof.

Fig. 4 is an enlarged broken sectional view of the structure illustrated in Fig. 3, taken on the line 4—4 thereof.

Fig. 5 is a sectional view of the structure illustrated in Fig. 4, taken on the line 5—5 thereof.

Fig. 6 is a sectional view of the structure illustrated in Fig. 5, taken on the line 6—6 thereof.

Fig. 7 is an enlarged sectional view of the structure illustrated in Fig. 1, taken on the line 7—7 thereof.

Fig. 8 is an enlarged sectional view of the structure illustrated in Fig. 7, taken on the line 8—8 thereof.

Fig. 9 is an enlarged sectional view of the structure illustrated in Fig. 1, taken on the line 9—9 thereof.

Fig. 10 is a plan view of structure, similar to that illustrated in Fig. 1, showing a modified form of my invention, Fig. 11 is an enlarged sectional view of the structure illustrated in Fig. 10, taken on the line 11—11 thereof, Fig. 12 is an enlarged sectional view of the structure illustrated in Fig. 11, taken on the line 12—12 thereof, Fig. 13 is an enlarged sectional view of the structure illustrated in Fig. 12, taken on the line 13—13 thereof, Fig. 14 is an enlarged sectional view of the structure illustrated in Fig. 12, taken on the line 14—14 thereof, Fig. 15 is an enlarged sectional view of the structure illustrated in Fig. 12, taken on the line 15—15 thereof, Fig. 16 is an enlarged sectional view of the structure illustrated in Fig. 11, taken on the line 16—16 thereof, Fig. 17 is an enlarged sectional view of the structure illustrated in Fig. 11, taken on the line 17—17 thereof, Fig. 18 is an enlarged broken sectional view of the structure illustrated in Fig. 10, taken on the line 18—18 thereof, Fig. 19 is an enlarged sectional view of the structure illustrated in Fig. 18, taken on the line 19—19 thereof, Fig. 20 is a broken enlarged view of the track construction illustrated in Fig. 13, Fig. 21 is an enlarged broken sectional view of a seat structure, similar to that illustrated in Fig. 11, showing a modified form thereof, Fig. 22 is a plan view, partly in section, of the structure illustrated in Fig. 21, Fig. 23 is a plan view of the front central portion of the structure illustrated in Fig. 21, and Fig. 24 is a view in elevation, partly in section, of the structure illustrated in Fig. 23.

In Fig. 1, I have illustrated a unit seat 21 made up of a passenger seat portion 22 and a driver's seat portion 23 which are of similar construction except for being of the opposite hand and so disposed relative to each other that their adjacent side edges 24 substantially abut to form a central section which is exactly aligned to provide a seating area for a third occupant. It has been the custom to have the driver's seat adjustable relative to the steering wheel and control levers and, in view of the necessity of retaining both of the seat portions in exact aligned relation, I have constructed the supports of each in such manner that both of the seats are adjustable as to driver position while retained in exact alignment.

The seat 21 is constructed to be employed with a two door type of forward and rear compartment automobile body wherein the occupant of the rear compartment obtains ingress and egress thereto through the space adjacent to the front seat. It has been the custom to have the seat adjustable in some manner to permit the passage of an occupant to and from the rear compartment but in this instance the driver's seat was adjusted independent of the passenger seat and each seat was designed for a single occupant and was not constructed with the intentions of having a third person occupy the space adjacent to the abutted edges of the seats.

Two forms of my invention are illustrated in the accompanying drawings, and I will now describe the form illustrated in Figs. 1 to 9. In Figs. 2 to 6, I have illustrated in detail the passenger seat 22 having a back 25 and a seat 26 which are relatively moved by links 27 similar to the manner illustrated and described in the copending application of J. A. Olivier, Serial No. 605,582, filed April 16, 1932, and assigned to the assignee of the present invention. The back 25 has the inner side thereof formed by an angle member 28 over which a metal panel 29 is secured and extended across the back and around the outer side and bent back upon itself to form a solid edge which may be similar to the box section marginal edge 31, illustrated in Fig. 2. The forwardly extending portion 32 of the angle member 28 has a laterally extending flange bent upwardly, at 33, to have the flange abut against the upwardly extending flange to provide double strength to the forwardly extending arm portion 32 of the back 25.

A brace member 34 of channel cross section extends along the bottom edge of the seat back as is clearly seen in Figs. 2 and 3. This brace member serves to provide means for securing the lower marginal edge of the panelling 29. The angular member 28 described above has a portion at one side thereof extended forwardly to form an arm 35 at one side of the seat construction as a whole. This arm is pivotally secured by means of a shouldered screw 36 to a bracket 37 attached to a trackway alignment 47 hereinafter described in detail. The arm 32 at the inner edge of the seat is likewise pivotally secured to a second trackway alignment 47 on the inner side of the seat, this pivot being coaxially aligned with the pivot 36 and being formed by means of a shouldered screw 41. The alignment of these pivots permits the seat back as a whole to be pivoted about the ends of these arms.

The link 27 above referred to, is pivoted on one end, at 42, to the outwardly directed flange of the channel 28, while the front end is secured to a bracket 43 on the seat 26 by a pivot 44. The arms 27 are provided on both sides of the seat and back and, in view of the different pivoted centers, the pivoting of the back 22 about the pivots 36 and 41 causes the seat 26 to be actuated forwardly by interconnecting links 27.

A seat bottom 45 is provided with a plate 46 having a slot 40 therein. The plate rests upon the movable track channel 47 which has a rivet 48 therein which extends through the slot 40 for the purpose of positioning the seat bottom 45 and permitting it to slide forward relative to the track channel 47. A spring washer 49 is provided between the head of the rivet 48 and the plate to retain the plate in engagement under suitable pressure. As illustrated more clearly in Fig. 5, the slot 40 is of such length as to permit the complete forward movement of the seat relative to the track, as illustrated in Fig. 2, for the purpose of providing material clearance for the entrance of a passenger into the vehicle at the door opening adjacent to the seat. The bracket 51, to which the arm 32, is secured is provided with an extension 52 having an aperture 53 therein in which a projecting lug 54 is disposed, the purpose of which will be described more fully hereinafter. The brackets 51 and 37 are secured to the track portions 47 to shift therewith when the seats are shifted as a unit and to form a fixed support for the seat back when the back is tilted to have the seat move relative to the track portion 47.

For the purpose of adjusting the seat relative to the levers and steering wheel as a unit, I have illustrated in Figs. 4, 5, 6 and 8 suitable tracks and locking mechanism which will now be described. Each side of the passenger seat 22 is provided with a track 38 as illustrated in Figs. 1 and 3, the track having a body portion 55 suitably secured to the floor on which it is mounted and of different width at the end to provide a predetermined slope to the seat, as illustrated in Fig. 2. The portion 55 has on the end thereof, a T-shaped head 56 upon which suitable rollers 57 may operate between the limits of stop elements 59 provided on the body portion 55 of the elements. The stop elements limiting the adjustment of the seat a predetermined amount relative to the track.

The track channel 47 is provided with a plurality of slots 61 in which an end 62 of a bell crank lever 63 is urged by a spring 64. The lever is rotatable about a pivot 65 in the trackway element 55 and is actuated by a projection 66 supported on a pivotally mounted rod 67. The tracks 38, it will be noted in Fig. 3, are of different lengths, the one on the outer side being shorter so as to be out of the way of the door opening to provide a clear passage therethrough. The tracks on the driver's seat are somewhat different and will be described later.

For strengthening the metal back panel 29, I have provided a metal strip 68 which is welded along its edges to the back panel and which is preferably flanged upwardly at 69 and welded to the side flange of the angle 28. The strip 68 is extended laterally to meet the curved outer side of the panel 29 and is welded thereto at its edge at 71. By forming a box section construction with the metal back panel 29 at this point, the back is materially strengthened and the twisting that was heretofore present is substantially eliminated.

A seat cushioning element 72 and a back cushioning element 73, of conventional form, is provided in the seat. While I say conventional form, I mean a conventional construction in so far as padding, resiliency and covering is provided. However, the shape of the seat is somewhat different in view of the inner end being of the contour of an elongated seat which is cut through in the middle and is not sloped or curved, as the outer edge would be constructed. In this construction the abutting edges of the passenger and operator's seats conform to the central portion of a single unit seat that is not foldable.

The seat back 23 of the driver's seat is similar in construction to the seat back 25 of the passenger seat 22 with the exception that the angle element 28 is not flanged inwardly against the upwardly extending flange but is retained, in angle relation to be directly bolted or otherwise secured to a seat bottom 75. A seat 76 is fixed to the bottom 75 forming a solid seat construction with the back. In this construction the entire back, seat, and seat bottom 75 is pivoted forwardly to provide clearance in a manner which will now be described.

The bottom 75 of the seat is provided at each side with a channel-shaped track element 47 which engages a T-shaped track element 56. In this construction, however, the track element 56 is not secured to the floor but is secured at one end to an arm 77 which is pivotally supported in a bracket 78 by the extending actuating rod 67. The rear end of the T-shaped track 56 has a threaded boss 80 thereon in which a threaded foot 79 is secured and which may be adjusted to regulate the height of the seat. The track construction is the same at both sides of the seat and both channel track elements 47 are provided with the slots 61 and the bell crank elements 63, above referred to are supported on the arms 77 in a position to have their arms 60 engaged by the projection 66 supported on the rod 67.

In all of the four tracks the four channel-shaped track elements 47 are preferably locked in position by the four bell crank elements 60. The rod 67 is extended upwardly at the side of the operator's seat at 81, as illustrated in Fig. 8, and is available to operate all of the elements 66 to release the detents 62 from the slots 61 in the channel elements 47 to permit all of the seats to be adjusted. For effecting the unit adjustment of the seats at the same time I have provided on the seat bottom 75 the projecting lug 54 above referred to, which projects into the aperture 53 provided in the extension 52 of the bracket 51 of the seat 22. This retains the seats in alignment during the time they are adjusted and at the same time permits either of the seats to be forwardly moved independently of the other. This is possible because only the seat 23 is tiltable, the seat 22 being slidable forwardly when the back is raised.

The seats thus constructed may be adjusted as to driver position as a unit and each of the seat halves forming the entire seat may be moved independently of each other to provide clearance at the side of the seat through the door opening.

As a further extension of my invention I have illustrated in Figs. 10 to 19 a preferred form of construction which is not only simpler in operation but is far more advantageous in use, and results obtained through the employment of the mechanism which will now be described in detail.

In Fig. 10 I have illustrated the passenger's seat 82 and the driver's seat 83 which are exactly similar except for being constructed for the opposite hand. The seat back follows the construction as above described, the operator's seat 83 illustrated in Fig. 10 has the inner pivotal arm 32 and an outer pivotal side portion 35 pivoted to brackets 90 on a seat bottom 84 by pivots 85.

Three sets of tracks are disposed in the floor of the car body, the track being of central T-shape having the bottom flanges upwardly extending at 87 for the purpose of providing only narrow openings 88 in the floor. Bolts 89 are employed for securing the tracks to the floor, the body portion 91 being flattened to extend between the flanges of the tracks and being peened over at 92 to provide a head. The wide body portion prevents the bolts from turning when a nut 93 is secured thereon.

Upon the three tracks 86 a T-shaped supporting frame 94, illustrated in dotted line in Fig. 10, is secured by slidable flanged-in channel brackets 95 carrying rollers 96 therein. Such brackets and rollers are supported on the element 94 along its front end at each of the tracks. A rear bracket 98 having a roller 96 therein is carried on the rearwardly projecting central portion 99 of the frame 94. The frame 94 is formed of metal having a downwardly projecting flange in its marginal edge to provide strength thereto. The portion 99 may be constructed separately and secured to the front portion of the frame by suitable rivets or by welding to form a unit frame construction. Suitable downwardly projecting bosses 101 are provided in the frame 94 to provide strengthened portions for supporting the brackets 95 and 98. It will be noted that two rollers are provided at each side and in the central portion of the frame in engagement with the track, to prevent any portion of the frame from being deflected.

The T-shaped track 86 is provided with a plurality of notches 102 in which a detent 103 of a latch 104 engages, being urged by a spring 105. The latches 104 are carried by a rod 106 which is pivotally supported in the flanges of the frame 94 and which is bent at right angles at 107 to provide an actuating end. The notches and latch are illustrated as being provided on the outer tracks 86 but it is to be understood that the latch may be employed on the central track alone or on all three or any of the tracks as expediency requires. In this manner the frame is movable relative to the vehicle floor and is adjustable to various positions.

The seat platforms 84 are slidable upon the frame 94, the rear outer edges of the seats being provided with a bracket 108 having a roller 96 therein which engages the tracks. The central rear portion of the seat platforms 84 rest upon embossed portions 100 of the frame 94 which extend upwardly the thickness of a plate 109 which will now be described. The front portion of the seat is slidably engaged to the frame 94 through a plate 109 having a slot 110 therein through which a bolt 111 extends having a resilient washer 112 thereon. The plates function in the same manner as the plate 46 referred to in regard to structure illustrated in Figs. 1 to 9 inclusive. That is to say, the front edge of the seat is positioned relative to the frame 94 at each side against movement except for a forward and rearward slidable movement regulated by the slot 110 provided in the plate. In this manner, the seat platforms 84 may be moved independently of the T-shaped frame 94 through the sliding of the plates 109 and platforms thereover an amount regulated by the slot 110 in the plate 109. During such movement the rear outer edges of the seat platform 84 are supported by the brackets 108 and rollers 96 which engage the outer tracks 86.

When the seats are to be adjusted in unison the movement of the frame 94 in the tracks carries the seat platforms 84 along their width with outer side edges supported by the brackets 108, the rollers 96 of which roll along the outer tracks 86. When the seats are individually moved, the seat platforms 84 slide over the frame 94 on the front and inside edges of the seat, while the rollers 96 in the brackets 108 roll along the tracks 86. The frame 94 is retained in position by the latches 104 which engage the notches 102 in the tracks.

Brackets 114 are secured to each side of the seat platforms 84, and are flanged outwardly at 115 to provide strength thereto. Each bracket has a large gear wheel 116 pivoted thereto by a pivot 117. A smaller gear 118 is welded or otherwise secured to the gear 116 and a washer 119 is preferably secured on the outer part of said gear 118 to constitute a guide for gear sectors 121 which are riveted, welded or otherwise secured to the side angle members 32 and 35 of the seat backs. The gears 116 engage racks in the nature of a plurality of punched openings 122 provided in the metal of the frame 94 the sides being flanged downwardly at 123 to provide body thereto to strengthen the metal about the openings in which the teeth of the gears 116 mesh, as illustrated in Fig. 15. All four sides of the seat are preferably provided with such gear mechanisms so that when the back is raised the arcuate movement of the sectors 121 operating in mesh with the gear 118 effects the rotation of the gear 116 which, operating in the opening 122 causes the seat platform 84 to be advanced relative thereto. The same movement could be effected by employing a single set of gears on each seat, but the employment of a double set is preferred to prevent binding of the seat bottom supports. Owing to the relative radii of the gears 118 and 116, the small angular movement of the back of the seats 82 and 83 causes a material rotation of the gear 116 and therefore a large advancement of the platform 84 frontwardly which it will be noted carries the pivots 85 of the seat back which is also moved forwardly relative to the seat. Gear trains could be employed in place of the gears 116 and 118 and would be of some advantage in diminishing the height of the brackets 114. This construction is believed a material advancement of that illustrated in the Figures 1 to 9 inclusive, in view of the fact that the seat backs therein illustrated do not move forwardly but only tilt about fixed pivots.

In the present described construction the pivots are advanced at the same time that the seat is raised to move the seat back as well as the seat forwardly to provide a large clearance at the door opening for the ingress and egress of passengers. This large opening is obtained through only a slight forward movement of the seat which quickly advances the back and seat forwardly out of a position directly adjacent the opening.

In either showing, each seat may be moved forwardly independent of the other and at the same time both seats are retained in aligned relation and are adjustable in accordance with the stature of the driver to a position in which the levers and the steering wheel can be conveniently reached. This construction is unique in that the movement of both seats in synchronism is effected through the adjustment of the supports of the seats, all or a portion of which moves when each of the seats are adjusted independently.

In Figs. 16 and 17, I have illustrated the preferred shape of the angle elements 28 of the adjacent portion of the seats, the portion of Fig. 17 being at the bottom of the seat and the portion of Fig. 16 being at the top thereof. The arcuate corners taper as a cone so that when one person is leaning back in the seat the seat will not have a sharp protruding corner projecting from aligned position with an adjacent seat. The conical rounded surfaces at the corners prevent such sharp stepped offset relation which would otherwise occur and enhances the appearance of the back at all times.

In Figs. 21 to 24 I have shown a further modified form of my invention embodying certain changes and improvements over the structure illustrated and described with reference to the figures on sheets 4 and 5 of the drawings. The actuating gearing is employed only on the outer edges of the two seats, the gearing illustrated on the adjacent portion of the seat being eliminated. It was found that the sturdy construction of the seat and their operation in parallel tracks caused the seats to function properly through their actuation by gearing on the one side only of the seat.

The bracket 114 for supporting the gearing is extended at 125 to form a support for a threaded boss 126 in which the pivot 85 is secured for supporting the arm 35 of the seat back. The gear 116, as illustrated in Fig. 22, has a pressed out central portion 127 for the purpose of offsetting the gear 118 from the edge of the supporting frame 94. Otherwise, the rack element 128 would interfere with the frame and require a slot to be disposed therein.

The arcuate rack element 128 is pivoted to the side edge 129 of the seat panel 29 at 132 for providing a simple means of assembly of the seat elements on the floor of the car. A pressed out finger 133 is provided on the arcuate rack element 128 which is engaged by one end of a spring 134, the other end of which is secured to a projecting lug 135 on the seat side. After the seat is assembled in the track it is pushed back to its rearmost position after which the arcuate element 128 is moved to have its teeth engage the teeth of the gear 116 and the spring 134 is hooked over the finger 133 and the seat is disposed in operating position.

As was pointed out hereinabove, the locking means for the platform 94 could be disposed on the central track only and this I have illustrated in Figs. 23 and 24. The head of the T track element 56 is provided with a plurality of laterally extending slots 136 in which a detent 137, which is supported normal to the seat on the end of an actuating rod 137, can engage. The rod is supported in an aperture in the flange of the frame 94 and in a bracket 138 which is welded or otherwise secured to the underside of the frame. A coil spring 139 is disposed about the shaft, one end of which engages the supporting bracket 138 and the other end of which urges the detent 137 into engagement with slot 136. The rod 137 is bent at right angles, at 141, and is disposed frontwardly of the platform 94 in position to be engaged by the occupants of the seat. Through the lifting of the rod portion 141, the detent 137 is disengaged from the slot 136 and after the seat is adjusted, the spring 139 causes movement of the detent 137 into engagement with a slot adjacent the position in which the seat frame 94 has been moved. In view of the sturdy mounting of the platform on the three tracks, it was found that a single clamping element was sufficient to retain the seat in fixed clamped relation and since the actuating handle is disposed adjacent to the central track it is in position to be engaged by any of the occupants of the seat and is believed to be a more practical construction than that which was described hereinabove, the handle of which was actuatable only from the driver's side of the seat.

In the construction illustrated in the last three sheets of drawings, a material advancement in the art is provided in view of the construction which carries the seat back forwardly with the seat when the seat is slightly moved arcuately about its pivot. In view of this lesser degree of movement required in the back to actuate the seat, a wide back can be employed on the seats, the pair of which can be constructed to simulate a single fixed type of seat. Since the body is wider at the central portion where the seat is disposed and, since very little forward movement is required of the present seat, the back need not be reduced in width. Further, this small movement of the back prevents it from interfering with the door and window handles which heretofore also required the seat back to be made narrower.

Greater entrance room is provided on both sides of the vehicle since the construction of the seat on the driver's side is such that the steering wheel is not a limiting element in the path of movement of the seat. The slight arcuate movement of the seat back causes it to advance forwardly in such manner that the steering apparatus does not interfere with the seat movement until after the desired opening is provided. A double type of seat is provided in the central portion of a car of the two-door type which embodies the width and comfort of a seat in the four-door type of body and has the additional advantage of providing large entrance clearance, less effort to operate and provides the adjusting feature to the seats as a unit.

While I have described and illustrated but two embodiments of my invention, it will be apparent to those skilled in the art that various changes, omissions, additions and substitutions may be made therein without departing from the spirit and scope of my invention as set forth in the accompanying claims.

I claim as my invention:

1. In a seat construction for vehicles, a platform, tracks on the vehicle upon which said platform is supported for movement, seats on said platform, portions of which are supported on the tracks and other portions of which are supported on the platform, means for effecting the movement of the seats and platform as a unit over the tracks, and means for moving the seats over the platform and tracks independent of the movement of the platform.

2. The combination with a seat having downwardly projecting channel elements, tracks engageable by said channel elements having T-shaped top portions, rollers in said channel elements engaging the top of said tracks, the base of said tracks having upwardly extending flanges slightly spaced from said T-shaped top portion for permitting the projection of the flanges of the channel therebetween.

3. The combination with a seat having downwardly projecting channel elements, tracks engageable by said channel elements having T-shaped top portions, rollers in said channel elements engaging the top of said tracks, the base of said tracks having upwardly extending flanges slightly spaced from said T-shaped top portions for permitting the projection of the flanges of the channel elements therebetween, said downwardly extending flange portions being bent inwardly to extend under the T-shaped top portions to retain the seat against upward movement.

4. A seat construction for vehicle bodies comprising a pair of transversely aligned mated seats having their adjacent edges so formed as to constitute a continuation of each other to provide a unit seat construction, a supporting frame common to both of said seats, trackways for mounting said supporting frame on the floor of the vehicle in which said seats are mounted, said trackways serving to permit longitudinal movement of said supporting frame and consequent longitudinal adjustment of said seats as a unit, backs for said seats each of said backs being pivotally connected with respect to its seat, trackways for supporting each of said seats on said supporting frame for longitudinal movement independently of each other and gearing interconnecting said seat backs and seats whereby pivotal movement of one of said backs serves to effect longitudinal movement of one of said seats.

5. A seat construction for vehicle bodies including in combination, trackways in said vehicle body, a seat supporting frame mounted on said trackways for movement therealong, a plurality of individual seats mounted on said seat supporting frame for longitudinal movement with respect thereto independently of each other, a seat back member pivotally connected to one of said seats, gear means carried by said seat and engaging said seat supporting frame, and a gear element carried by said seat back for actuating said gear means whereby the seat and back are moved longitudinally when the seat back is pivotally moved.

6. A seat construction for vehicle bodies including in combination, trackways within said vehicle body, a seat supporting frame supported on said trackways, aligned mated seat portions movably mounted on said seat supporting frame, a seat back portion associated with each of said seat portions, said seat back portions being pivotally connected to said seat frame whereby the same may be tilted with respect thereto, and means interconnecting said seat back portions with said seat portions to effect movement of said seat portions upon tilting of said seat back portions.

ALFRED H. HABERSTUMP.